United States Patent
Al-Ghamdi

(10) Patent No.: US 12,312,532 B2
(45) Date of Patent: May 27, 2025

(54) METHODS AND SYSTEMS FOR FORMING A SOLIDIFIED FLUID BARRIER IN A WELLHEAD

(71) Applicant: Saudi Arabian Oil Company, Dhahran (SA)

(72) Inventor: Ahmed Abdullah Al-Ghamdi, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/489,146

(22) Filed: Oct. 18, 2023

(65) Prior Publication Data

US 2025/0129284 A1  Apr. 24, 2025

(51) Int. Cl.
*C09K 8/44* (2006.01)

(52) U.S. Cl.
CPC ............ *C09K 8/44* (2013.01); *C09K 2208/10* (2013.01)

(58) Field of Classification Search
CPC ..... C09K 8/44; C09K 2208/10; E21B 47/005; E21B 47/024; E21B 33/13
See application file for complete search history.

(56) References Cited

U.S. PATENT DOCUMENTS

| 9,797,240 | B2 | 10/2017 | Tunget | |
| 11,434,714 | B2* | 9/2022 | Machocki | E21B 33/1208 |
| 2020/0116007 | A1* | 4/2020 | Mandal | E21B 47/005 |
| 2021/0071481 | A1* | 3/2021 | Al-Abdulrahman | E21B 41/00 |

* cited by examiner

*Primary Examiner* — Silvana C Runyan
(74) *Attorney, Agent, or Firm* — DINSMORE & SHOHL LLP

(57) ABSTRACT

Embodiments herein are directed to a method for forming a solidified fluid barrier in a wellhead including: injecting a wellhead sealing composition into a first flow line, a second flow line, a crown valve, or combinations thereof of the wellhead, the wellhead including at least a wellbore casing, a master valve, a fluid chamber, a first wing valve, a second wing valve, and a crown valve; pumping the wellhead sealing composition including a cyclodextrin, water, and an azaarene into the fluid chamber of the wellhead; and heating the wellhead sealing composition to solidify the wellhead sealing composition in the fluid chamber. Further embodiments herein are directed to a wellhead for a subsurface well including a wellbore casing, a master valve, a fluid chamber including a solidified fluid barrier including alpha-cyclodextrin, water, and 4-methylpyridine, a first wing valve, a second wing valve, and a crown valve.

15 Claims, 4 Drawing Sheets

METHODS AND SYSTEMS FOR FORMING A SOLIDIFIED FLUID BARRIER IN A WELLHEAD

TECHNICAL FIELD

Embodiments of the present disclosure generally relate to methods and systems for wellhead barriers, and more specifically, to methods and systems for forming a solidified fluid barrier in a wellhead.

BACKGROUND

Oil and gas wells are equipped with wellheads to control the flow of hydrocarbons during operation. It is commonly required to conduct well intervention to acquire information about the wells, perform routine maintenance procedures, or rig up equipment. Accordingly, wellhead barriers are required to prevent well reservoir contents from reaching the atmosphere and to ensure the safety of crew members.

SUMMARY

Wellhead barriers, also known as isolation or control barriers, can be heavy fluids or mechanical devices. Depending on the well type, it is typical in the industry to have two physical barriers in place for redundancy to maintain well integrity. Traditional wellhead barriers utilizing fluids usually require high pressures and/or large volumes of liquid. These traditional barriers may also cause problems with well integrity, resulting in uncontrolled fluid leakage or damage to the well structure. Traditional wellhead barriers utilizing mechanical devices may be time-consuming to install and remove. As such, there are situations where an additional barrier may be required or where traditional methods or systems of wellhead barriers are not feasible.

For example, it is desired to have a wellhead barrier that can be pumped into a wellhead using the existing components of the wellhead. Moreover, it is highly desired for wellhead barriers to maintain well integrity and safety while being easy to install and reducing downtime of operation.

Consequently, described herein are methods and systems for forming a solidified fluid barrier in a wellhead, which provides the aforementioned benefits. Particularly, the solidified barrier is a fluid composition that may be injected through existing flow lines or injection ports on the wellhead and pumped into a fluid chamber of the wellhead. Upon subjecting the wellhead to increased temperatures, either externally or internally, the fluid composition will undergo a phase transition from liquid to solid, such as by host-guest interactions and/or crystallization, thus providing an additional barrier between the well contents and the atmosphere. Heating the composition may include, but may not be limited to, chemical reactions, external conductive heating, or utilizing electromagnets to generate an oscillating field affecting magnetic nanoparticles in the fluid composition. The solid barrier may also be removed by transitioning the solid barrier back into a liquid, such as through cooling or exposure to an acid. The re-transition fluid composition may subsequently be removed from the wellhead cavity through injection of a displacement fluid.

In accordance with an embodiment of the present disclosure, a method for forming a solidified fluid barrier in a wellhead includes injecting a wellhead sealing composition into a first flow line, a second flow line, a crown valve, or combinations thereof of the wellhead, wherein the wellhead also includes a wellbore casing including a fluid inlet and a fluid outlet, a master valve coupled to the fluid outlet of the wellbore casing, a fluid chamber fluidly connected to the master valve, a first wing valve fluidly connected to the fluid chamber, wherein the first wing valve is also fluidly connected to the first flow line, a second wing valve fluidly connected to the fluid chamber, wherein the second wing valve is also fluidly connected to the second flow line, and the crown valve fluidly connected to the fluid chamber; pumping the wellhead sealing composition into the fluid chamber, the wellhead sealing composition including water, a cyclodextrin selected from alpha-cyclodextrin, beta-cyclodextrin, gamma-cyclodextrin, or combinations thereof, and an azaarene selected from pyridine, 2-methylpyridine, 3-methylpyridine, 3,4-dimethylpyridine, 4-methylpyridine, or combinations thereof; and heating the wellhead sealing composition to solidify the wellhead sealing composition in the fluid chamber of the wellhead, thereby forming the solidified fluid barrier.

In accordance with another embodiment of the present disclosure, a wellhead for a subsurface well includes a wellbore casing comprising a fluid inlet and a fluid outlet; a master valve coupled to the fluid outlet of the wellbore casing; a fluid chamber fluidly connected to the master valve, wherein the fluid chamber comprises a solidified fluid barrier comprising alpha-cyclodextrin, water, and 4-methylpyridine; a first wing valve fluidly connected to the fluid chamber, wherein the first wing valve is also fluidly connected to a first flow line; a second wing valve fluidly connected to the fluid chamber, wherein the second wing valve is also fluidly connected to a second flow line; and a crown valve fluidly connected to the fluid chamber via the fluid inlet.

In accordance with yet another embodiment of the present disclosure, a wellhead sealing composition includes a cyclodextrin selected from alpha-cyclodextrin, beta-cyclodextrin, gamma-cyclodextrin, or combinations thereof; water; and an azaarene selected from pyridine, 2-methylpyridine, 3-methylpyridine, 3,4-dimethylpyridine, 4-methylpyridine, or combinations thereof.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Figure (FIG. 1 depicts a front view of a wellhead, in accordance with one or more embodiments described herein.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods and systems for forming a solidified fluid barrier in a wellhead.

As used herein, a "crown valve" refers to the topmost valve on a wellhead that may provide vertical access to the wellhead. The crown valve may also be referred to as a swab valve.

As used herein, a "fluid chamber" refers to the void cross space between the wing valves, the master valve, and the crown valve of a wellhead. The fluid chamber may also be referred to as a wellhead cavity.

As used herein, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

Figure 1:
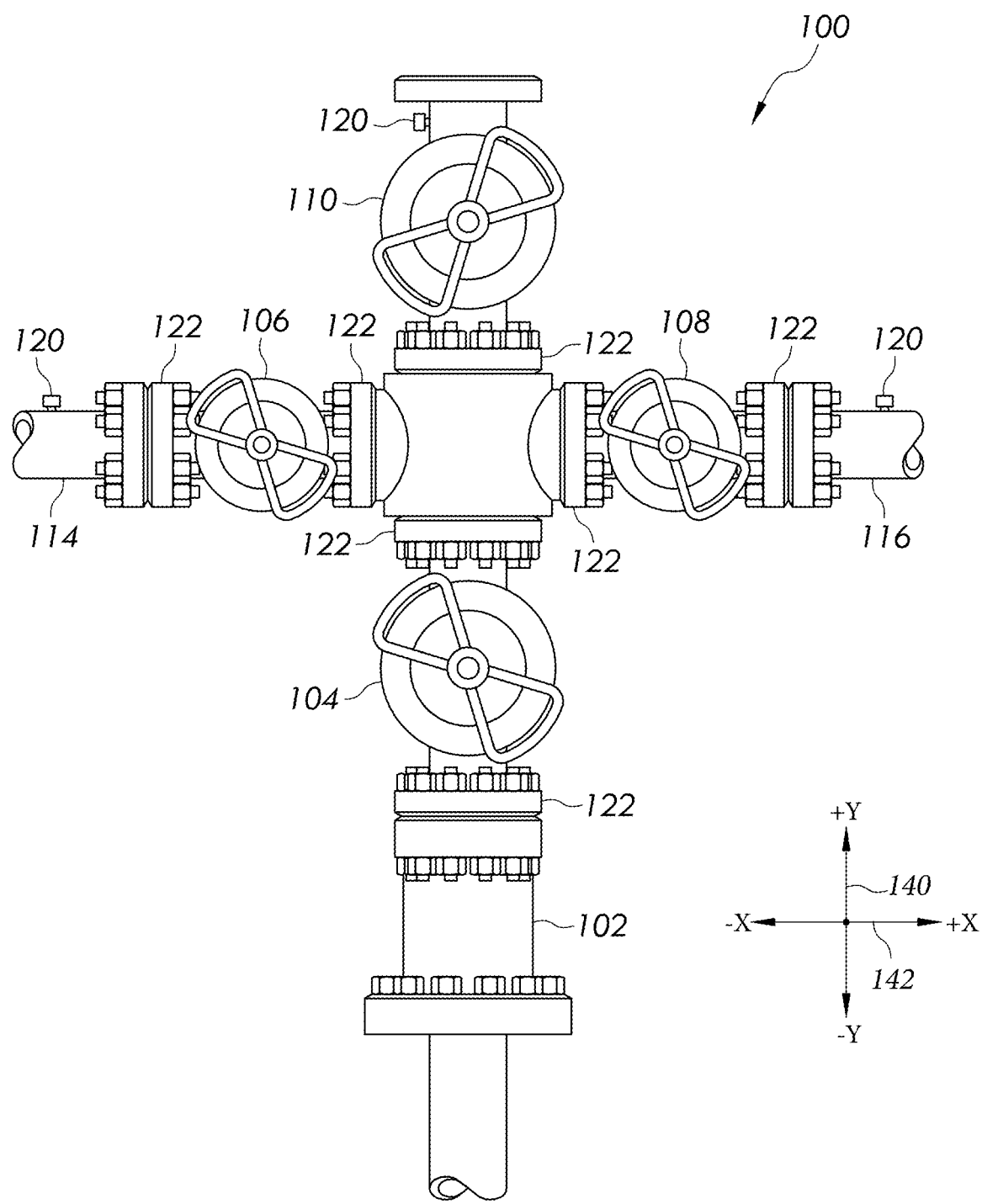
Figure 2:
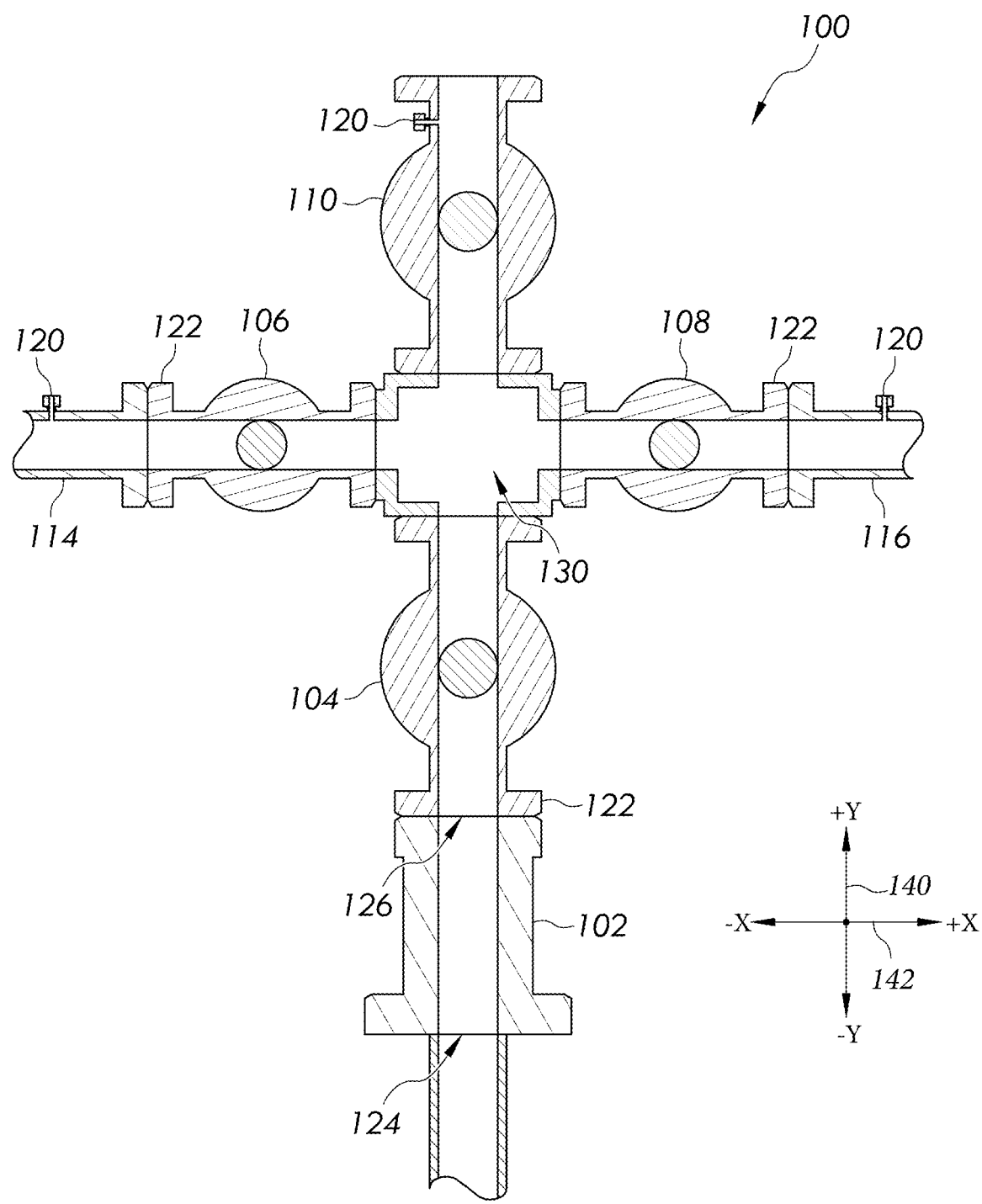
FIG. 2 depicts a cross section of the wellhead of FIG. 1, in accordance with one or more embodiments described herein.

Referring initially to FIG. 1, a wellhead 100 according to one or more embodiments herein is depicted. As shown in FIG. 1, the wellhead may include a wellbore casing 102, a master valve 104, a first wing valve 106, a second wing valve 108, and a crown valve 110. Now referring to FIG. 2, illustrated is a cross-sectional view of the wellhead 100. As shown in FIG. 2, the wellhead 100 may include a fluid chamber 130. The wellbore casing 102 may have a fluid inlet 124 and a fluid outlet 126. The master valve 104 may be coupled to the fluid outlet 126 of the wellbore casing 102. For example, and as illustrated in FIGS. 1 and 2, the master valve 104 may be coupled to the wellbore through one or more coupling means 122. As used herein "coupling means" may include, but may not be limited to flange-type connectors, threaded connectors, adhesive connectors, magnetic connectors, or the like. Similarly, a first component being "coupled to" a second component may likewise refer to the coupling of the components through one or more coupling means.

The fluid chamber 130 may be fluidly connected to the master valve 104, the first wing valve 106, and the second wing valve 108. For example, and as illustrated in FIGS. 1 and 2, the fluid chamber 130 may be coupled to the master valve 104, the first wing valve 106, and the second wing valve 108. The first wing valve 106 may also be fluidly connected and/or coupled to a first flow line 114, and the first flow line 114 may be fluidly connected and/or coupled to an injection port 120. Similarly, the second wing valve 108 may be fluidly connected and/or coupled to a second flow line 116, and the second flow line 116 may be fluidly connected and/or coupled to an injection port 120. The crown valve 110 may be fluidly connected and/or coupled to the fluid chamber 130 and may also be fluidly connected and/or coupled to an injection port 120. In embodiments, the injection ports 120 may have an inner diameter of approximately 0.5 inches. The inner diameter of the injection ports 120 may also be from 0.1 in to 0.2 in, from 0.2 in to 0.3 in, from 0.3 in to 0.4 in, from 0.4 in to 0.5 in, from 0.5 in to 0.75 in, from 0.75 in to 1 in, from 1 in to 1.25 in, from 1.25 in to 1.5 in, from 1.5 in to 1.75 in, from 1.75 in to 2 in, from 2 in to 2.5 in, from 2 in to 3 in, from 3 in to 4 in, from 4 in to 6 in, from 6 in to 8 in, from 8 in to 10 in, or any combination of ranges or smaller range therein, such as from 0.1 in to 10 in.

Still referring to FIGS. 1 and 2, and in embodiments, the master valve 104 may be positioned above the wellbore casing 102, such as on a first line 140. The fluid chamber 130 may be positioned above the master valve 104, such as on the first line 140. Similarly, the crown valve 110 may be positioned above the fluid chamber 130 such as on the first line 140. The first wing valve 106 and the first flow line 114 may extend away from the fluid chamber 130 on a second line 142. The second line 142 may be transverse to the first line 140, such as perpendicular to the first line 140. Likewise, the second wing valve 108 and the second flow line 116 may extend on the second line 142 away from the fluid chamber 130 and may be in line with the first wing valve 106 and first flow line 114.

Still referring to FIG. 1, in embodiments, a second master valve (not shown) may be interposed between the master valve 104 and the fluid chamber 130, and may be fluidly connected to and/or coupled to both. A third wing valve (not shown) may be interposed between the first wing valve 106 and the first flow line 114, and may be fluidly connected to and/or coupled to both. Likewise, a fourth wing valve (not shown) may be interposed between the second wing valve 108 and the second flow line 116, and may be fluidly connected to and/or coupled to both. A second crown valve (not shown) may be fluidly connected to the crown valve 110, and may be fluidly connected to and/or coupled to both.

Still referring to FIGS. 1-2, the fluid chamber 130 may comprise or contain a solidified fluid barrier, as described in further detail hereinbelow. For example, and in embodiments, the solidified fluid barrier may comprise alpha-cyclodextrin, water, and 4-methylpyridine and may be a solidified form of the wellhead sealing compositions described hereinbelow.

As previously stated, the wellhead 100 may comprise one or more wing valves, one or more crown valves, and one or more master valves. In embodiments, the valves may be any valves known in the art, such as mechanically operated valves, hydraulically operated valves, electrically operated valves, or combinations thereof. The wellhead 100 may also comprise one or more additional components, as may be described in further detail hereinbelow.

Figure 3:
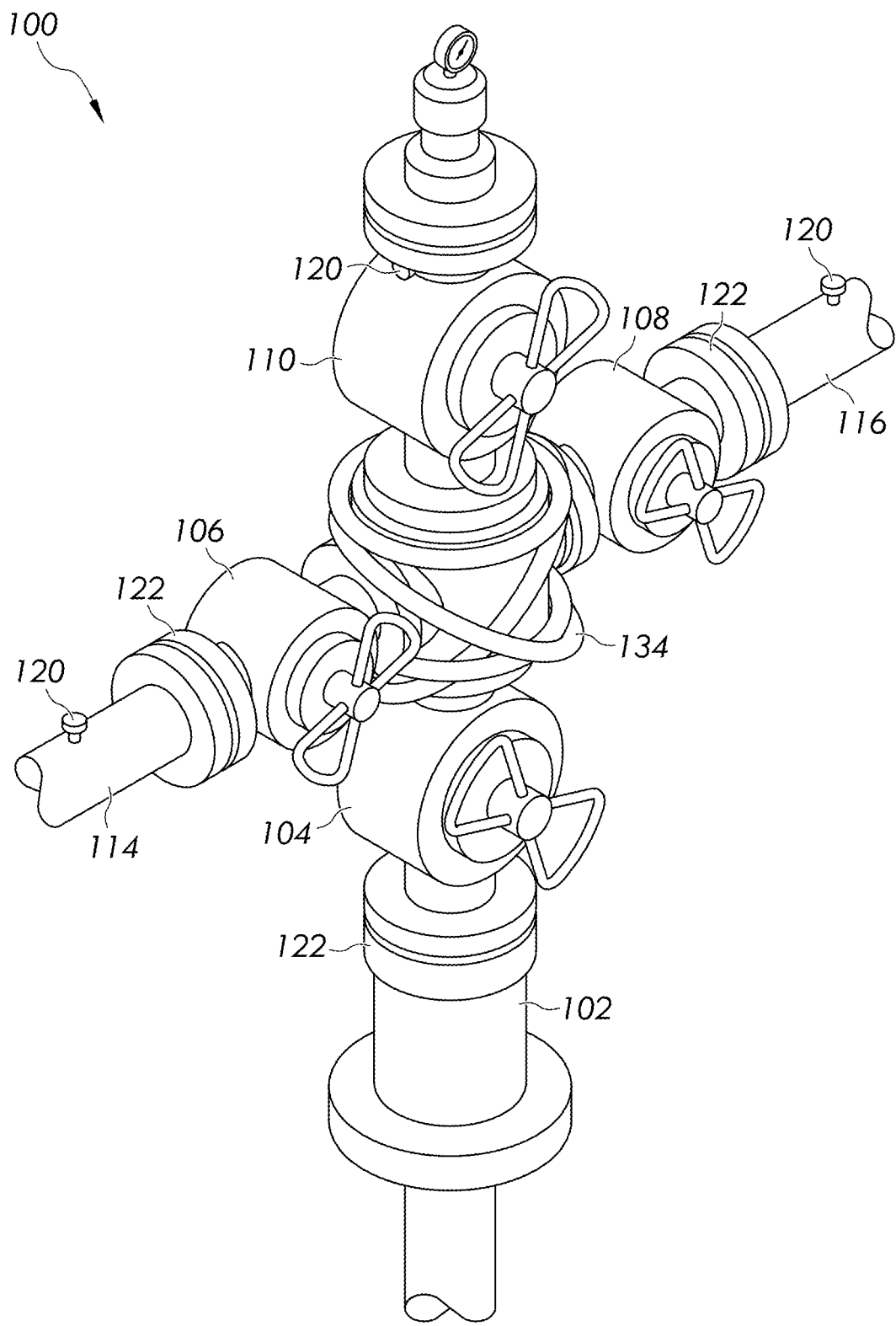
FIG. 3 depicts a perspective view of the wellhead of FIG. 1, in which thermally conductive tubing is positioned on an exterior of the wellhead, in accordance with one or more embodiments described herein.

Referring now to FIG. 3, a perspective view of a wellhead 100 according to one or more embodiments herein is depicted. As shown in FIG. 3, the wellhead 100 may further include one or more thermally conductive tubes 134 positioned on an exterior of the fluid chamber 130. The thermally conductive tubes 134 may be composed of any one of a number of materials known to be thermally conductive. For example, and in embodiments, the thermally conductive tubes 134 may include copper, aluminum, or combinations thereof. As shown in FIG. 3, the one or more thermally conductive tubes 134 may be arranged in an overlapping pattern around the fluid chamber 130, however this is not required. For example, and in embodiments, the one or more thermally conductive tubes 134 may be concentrically arranged, i.e. wrapped, around the wellhead 100. Similarly, while the one more thermally conductive tubes 134 are shown positioned on an exterior of the fluid chamber 130, the one or more thermally conductive tubes 134 may also or alternatively be positioned on an exterior of any other component of the wellhead 100.

Figure 4:
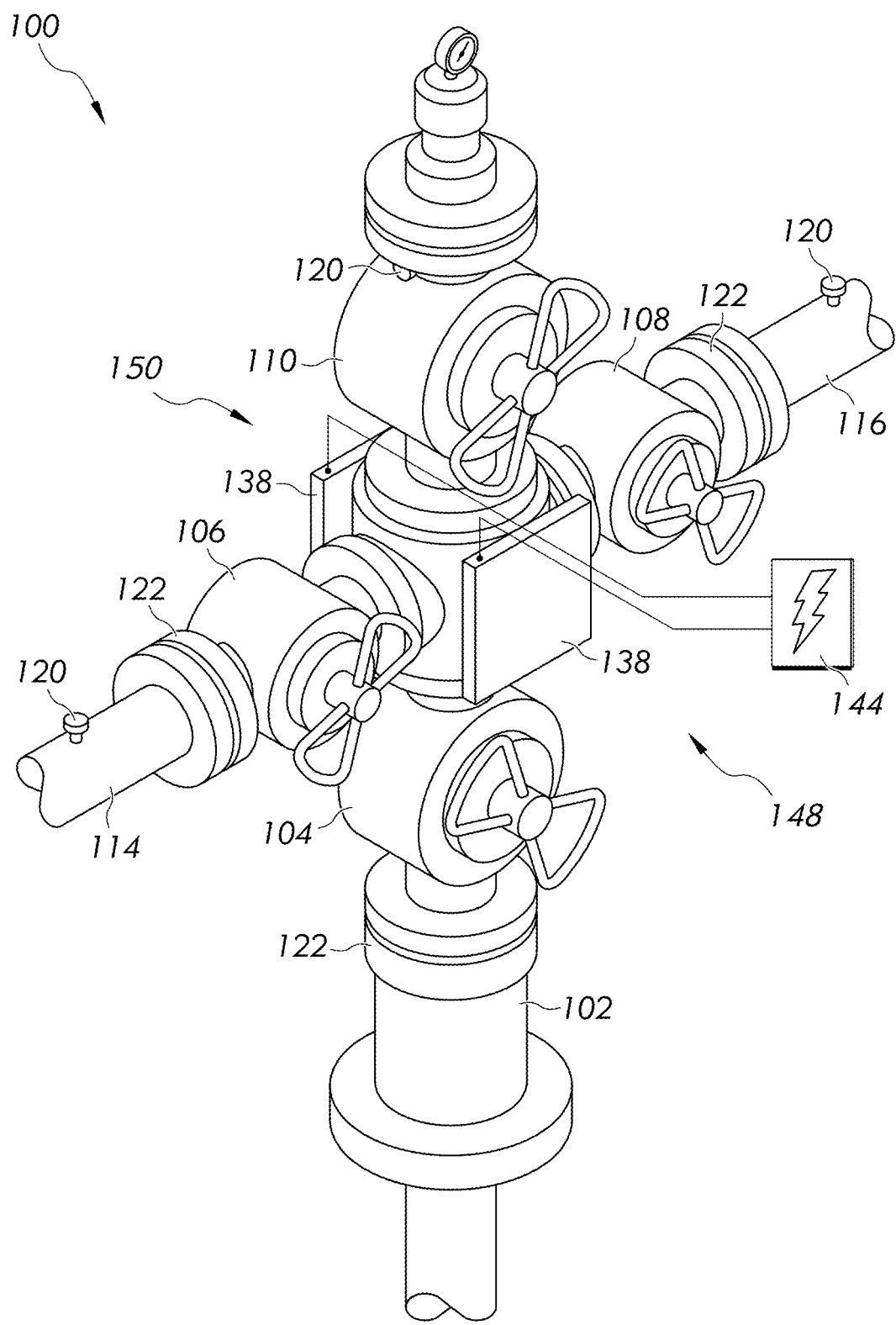
FIG. 4 depicts a perspective view of the wellhead of FIG. 1, in which one or more electromagnets are positioned on an exterior of the wellhead, in accordance with one or more embodiments described herein.

Referring now to FIG. 4, a perspective view of a wellhead 100 according to one or more embodiments herein is depicted. As shown in FIG. 4, the wellhead 100 may include one or more electromagnets 138 positioned on an exterior of a fluid chamber 130. The one or more electromagnets 138 may also be connected to a power source 144 for providing electrical current to the one or more electromagnets 138. Without being limited by theory, the wellhead 100 may itself provide a grounding effect, by virtue of being drilled and fixed on the ground, thereby preventing the electromagnets 138 from being electrically live. The electromagnets 138 may be comprised of a core comprising any one or more of a number of materials known to be ferromagnetic or ferrimagnetic. For example, and in embodiments, the core may comprise iron, nickel, cobalt, or combinations thereof. The electromagnets 138 may further comprise wire wrapped or coiled around the core. The wire may comprise any one or more of a number of materials known to be electrically conductive, for example, and in embodiments, the wire may comprise copper, aluminum, or combinations thereof. Without being limited by theory, an electric current is passed through the wires which creates a magnetic field. In embodiments, the electromagnets 138 may take the form of electromagnetic plates. In embodiments, the one or more electromagnets 138 may be arranged in such a manner that the fluid chamber 130 may be exposed to a directional or oscillating magnetic field across the fluid chamber 130 when the one or more electromagnets 138 are in operation. For example, and in embodiments, one electromagnet 138 may be positioned on the front side 148 of the exterior of the wellhead 100 and one electromagnet 138 may be positioned on the back side 150 of the exterior of the wellhead 100.

In embodiments comprising the one or more electromagnets 138, the wellhead sealing composition may further comprise magnetic nanoparticles. The magnetic nanoparticles may be any one or more of a number of materials known to be magnetic. For example, and in embodiments, the magnetic nanoparticles may comprise iron, nickel, cobalt, or combinations thereof. In embodiments, the iron, nickel, cobalt, or combinations thereof may be oxide-based. For example, the magnetic nanoparticles may be iron oxide, nickel oxide, cobalt oxide, or combinations thereof.

Referring to FIGS. 1-4, and as previously stated, embodiments herein may also include methods of using a wellhead sealing composition. Referring to FIG. 1, the method may first include injecting a wellhead sealing composition into the wellhead 100. The wellhead sealing composition may be injected into injection ports 120 fluidly connected to the first flow line 114, the second flow line 116, the crown valve 110, or combinations thereof of the wellhead 100.

Still referring to FIG. 1, the method may then include pumping the wellhead sealing composition into the fluid chamber 130 of the wellhead 100. The wellhead sealing composition may then be heated to solidify the wellhead sealing composition, thereby forming the fluid barrier in the fluid chamber 130. In embodiments, the solidification may occur through crystallization of the wellhead sealing composition and/or host-guest interactions between the cyclodextrins and the azaarenes. In embodiments, the wellhead sealing composition may be heated to a temperature of from 50° C. to 100° C. to initiate the phase change from liquid to solid. For example, and in embodiments, the wellhead sealing composition may be heated to from 50° C. to 60° C., from 60° C. to 70° C., from 70° C. to 80° C., from 80° C. to 90° C., from 90° C. to 100° C., or any combination of ranges or smaller range therein.

Still referring to FIG. 1, in embodiments, heating the wellhead sealing composition may include injecting a thermochemical composition into the fluid chamber 130 through the injection ports 120. Without being limited by theory, the thermochemical composition may react in the fluid chamber 130 to generate an exothermic reaction, thereby heating and solidifying the wellhead sealing composition. The thermochemical component may include a nitrite-containing compound and an ammonium-containing compound. The ammonium-containing compound may include ammonium chloride, ammonium bromide, ammonium nitrate, ammonium sulfate, ammonium carbonate, ammonium hydroxide, or combinations thereof. In embodiments, the nitrite-containing compound may include sodium nitrite, potassium nitrite, or combinations thereof. In embodiments, the thermochemical component may include sodium nitrite and ammonium chloride. In embodiments, the thermochemical composition may comprise ammonium chloride and sodium nitrite. In embodiments, the thermochemical composition may comprise the ammonium-containing compound and the nitrite-containing compound in a 1:1 molar concentration.

Referring again to FIG. 3, heating the wellhead sealing composition may include introducing a heated fluid through one or more thermally conductive tubes 134 positioned on an exterior of the fluid chamber 130, which may be any of the one or more thermally conductive tubes 134 hereinbefore described. In embodiments, the heated fluid may include steam, water, or combinations thereof.

Referring again to FIG. 4, the wellhead sealing composition may be heated by subjecting the magnetic nanoparticles in the composition to an oscillating magnetic field through the one or more electromagnets 138 positioned on an exterior of the fluid chamber 130, as hereinbefore described. Without being limited by theory, the magnetic nanoparticles may rotate due to the polarity of the oscillating field and the rotational movement may generate friction within the fluid that generates heat.

Referring now to FIGS. 1-4, the method may also include one or more additional steps. For example, the method may include cooling the wellhead sealing composition to initiate a phase change from solid to liquid. In embodiments, cooling the wellhead sealing composition may include introducing a cooling fluid through the one or more thermally conductive tubes 134. The cooling fluid may comprise water, liquid nitrogen, or combinations thereof.

In embodiments, the method may include exposing the wellhead sealing composition to an acid in order to dissolve the wellhead sealing composition. The acid may be injected into the injection ports 120 of the wellhead 100 and pumped into the fluid chamber 130. In embodiments, the acid may include hydrochloric acid, nitric acid, sulfuric acid, hydrobromic acid, hydroiodic acid, perchloric acid, chloric acid, acetic acid, or combinations thereof.

In embodiments, the method may include removing the wellhead sealing composition from the fluid chamber 130 of the wellhead 100 after cooling or dissolving the wellhead sealing composition, as described hereinabove. In embodiments, removal may include pumping a displacement fluid into the fluid chamber 130 to displace the wellhead sealing composition. For example and not by way of limitation, the displacement fluid may be injected into the injection port 120 located on the first flow line 114. The wellhead sealing composition may then be removed through the crown valve 110, the second flow line 116, or displaced into the wellbore casing 102. Similarly, the displacement fluid may be injected into the injection port 120 located on the second flow line 116. The wellhead sealing composition may then be removed through the crown valve 110, the first flow line 114, or displaced into the wellbore casing 102. The displacement fluid may comprise the water, the acid, or combinations thereof.

As previously described, the wellhead sealing composition may comprise alpha-cyclodextrin, water, and 4-methylpyridine. As described herein, the water may be pure water or any aqueous solution such as those selected from the group consisting of formation water; filtered seawater; untreated seawater; natural salt water; brackish salt water; saturated salt water; synthetic brine; mineral waters; potable water containing one or more dissolved salts, minerals, and organic materials; non-potable water containing one or more dissolved salts, minerals, and organic materials; deionized water; tap water; distilled water; fresh water; or combinations thereof.

In embodiments, the wellhead sealing composition may comprise alpha-cyclodextrin, sometimes abbreviated as α-CD, in an amount of from 1.0 wt. % to 5.0 wt. % by weight of the wellhead sealing composition. For example, the wellhead sealing composition may comprise alpha-cyclodextrin in an amount from 1.0 wt. % to 2.0 wt. %, from 2.0 wt. % to 3.0 wt. %, from 3.0 wt. % to 4.0 wt. % from 4.0 wt. % to 5.0 wt. %, or any combination of ranges or smaller range therein, by weight of the wellhead sealing composition. In further embodiments, the alpha-cyclodextrin may be supplemented or substituted with a cyclodextrin selected from beta-cyclodextrin, gamma cyclodextrin, or combinations thereof.

In embodiments, the wellhead sealing composition may comprise water in an amount of from 15 wt. % to 30 wt. % by weight of the wellbore sealing composition. For example, the wellhead sealing composition may comprise water in an amount of from 15 wt. % to 20 wt. %, from 20 wt. % to 25 wt. %, from 25 wt. % to 30 wt. %, or any combination of ranges or smaller range therein, by weight of the wellhead sealing composition.

In embodiments, the wellhead sealing composition may comprise 4-methylpyridine in an amount of from 70 wt. % to 85 wt. % by weight of the wellbore sealing composition. For example, the wellhead sealing composition may comprise 4-methylpyridine in an amount of from 70 wt. % to 75 wt. %, from 75 wt. % to 80 wt. %, from 80 wt. % to 85 wt. %, or any combination of ranges or smaller range therein, by weight of the wellhead sealing composition. In further embodiments, the 4-methylpyridine may be supplemented or substituted with an azaarene selected from pyridine, 2-methylpyridine, 3-methylpyridine, 3,4-dimethylpyridine, or combinations thereof.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

As used herein, the singular forms "a", "an" and "the" include plural referents, unless the context clearly dictates otherwise. It is noted that recitations herein of "at least one" component, element, etc., should not be used to create an inference that the alternative use of the articles "a" or "an" should be limited to a single component, element, etc.

As used herein and in the appended claims, the words "comprise", "has", and "include" and all grammatical variations thereof are each intended to have an open, non-limiting meaning that does not exclude additional elements or steps.

As used herein, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of forming a solidified fluid barrier in a wellhead, the method comprising:
   injecting a wellhead sealing composition into a first flow line, a second flow line, a crown valve or combinations thereof of the wellhead, wherein the wellhead also comprises:
      a wellbore casing comprising a fluid inlet and a fluid outlet,
      a master valve coupled to the fluid outlet of the wellbore casing,
      a fluid chamber fluidly connected to the master valve,
      a first wing valve fluidly connected to the fluid chamber, wherein the first wing valve is also fluidly connected to the first flow line,
      a second wing valve fluidly connected to the fluid chamber, wherein the second wing valve is also fluidly connected to the second flow line, and
      the crown valve fluidly connected to the fluid chamber;
   pumping the wellhead sealing composition into the fluid chamber, the wellhead sealing composition comprising water, a cyclodextrin selected from the group consisting of alpha-cyclodextrin, beta-cyclodextrin, gamma-cyclodextrin, or combinations thereof, and an azaarene selected from the group consisting of pyridine, 2-methylpyridine, 3-methylpyridine, 3,4-dimethylpyridine, 4-methylpyridine, or combinations thereof; and heating the wellhead sealing composition to solidify the wellhead sealing composition in the fluid chamber of the wellhead, thereby forming the solidified fluid barrier.

2. The method of claim 1, wherein the azaarene is 4-methylpyridine.

3. The method of claim 1, wherein the cyclodextrin is alpha-cyclodextrin.

4. The method of claim 1, wherein heating the wellhead sealing composition comprises introducing a heated fluid through one or more thermally conductive tubes positioned on an exterior of the fluid chamber.

5. The method of claim 1, wherein heating the wellhead sealing composition comprises injecting a thermochemical composition into the fluid chamber.

6. The method of claim 5, wherein the thermochemical composition comprises ammonium chloride and sodium nitrite.

7. The method of claim 1, wherein:
the wellhead sealing composition further comprises magnetic nanoparticles;
the wellhead further comprises one or more electromagnets positioned on an exterior of the wellhead; and
heating the wellhead sealing composition comprises subjecting the magnetic nanoparticles of the wellhead sealing composition to an oscillating magnetic field through the one or more electromagnets.

8. The method of claim 7, wherein the magnetic nanoparticles comprise iron, nickel, cobalt, or combinations thereof.

9. The method of claim 1, further comprising removing the wellhead sealing composition from the fluid chamber of the wellhead.

10. The method of claim 9, wherein removing the wellhead sealing composition from the fluid chamber of the wellhead comprises:
cooling the wellhead sealing composition to liquefy the wellhead sealing composition in the fluid chamber of the wellhead; and
pumping a displacement fluid into the fluid chamber to displace the wellhead sealing composition.

11. The method of claim 10, wherein cooling the wellhead sealing composition comprises introducing a cooling fluid through one or more thermally conductive tubes positioned on an exterior of the fluid chamber.

12. The method of claim 9, wherein removing the wellhead sealing composition from the fluid chamber of the wellhead comprises:
exposing the wellhead sealing composition to an acid; and
pumping a displacement fluid into the fluid chamber to displace the wellhead sealing composition.

13. The method of claim 12, wherein the acid comprises hydrochloric acid, nitric acid, sulfuric acid, hydrobromic acid, hydroiodic acid, perchloric acid, chloric acid, acetic acid, or combinations thereof.

14. The method of claim 1, wherein the wellhead sealing composition is heated to from 50° C. to 100° C.

15. The method of claim 1, wherein the wellhead sealing composition is injected through one more injection ports that are fluidly connected to the first flow line, the second flow line, the crown valve, or combinations thereof.

* * * * *